J. L. GILLMORE.
FIRE ESCAPE.
APPLICATION FILED MAR. 10, 1911.
1,015,485.
Patented Jan. 23, 1912.
2 SHEETS—SHEET 1.
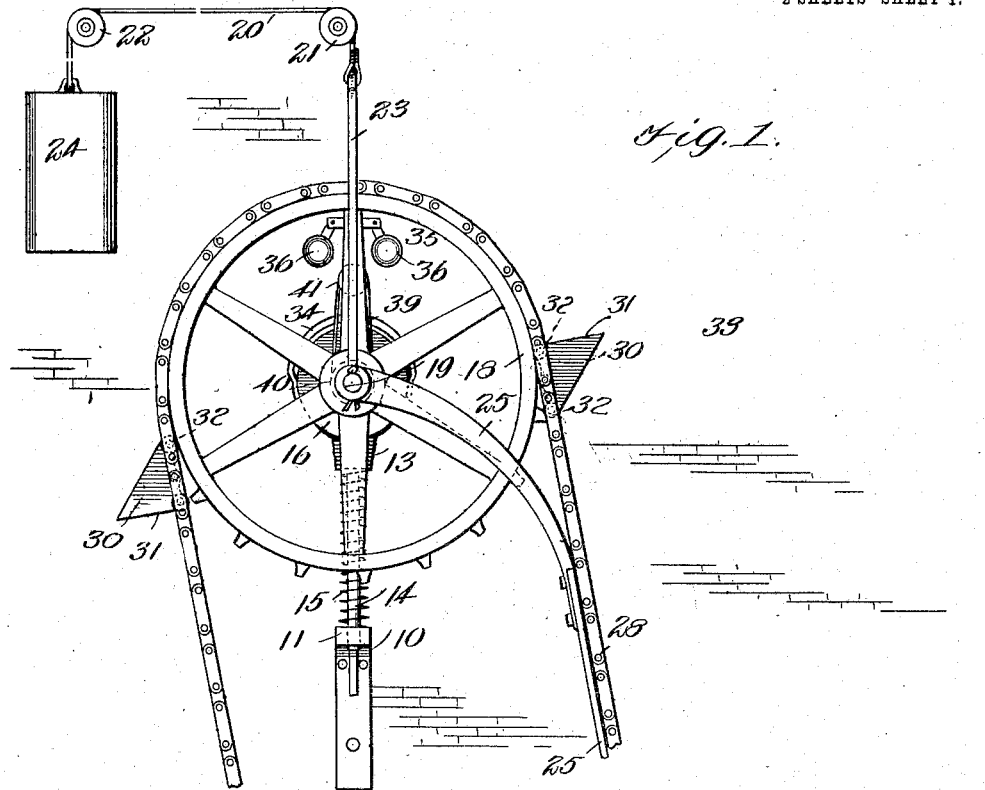
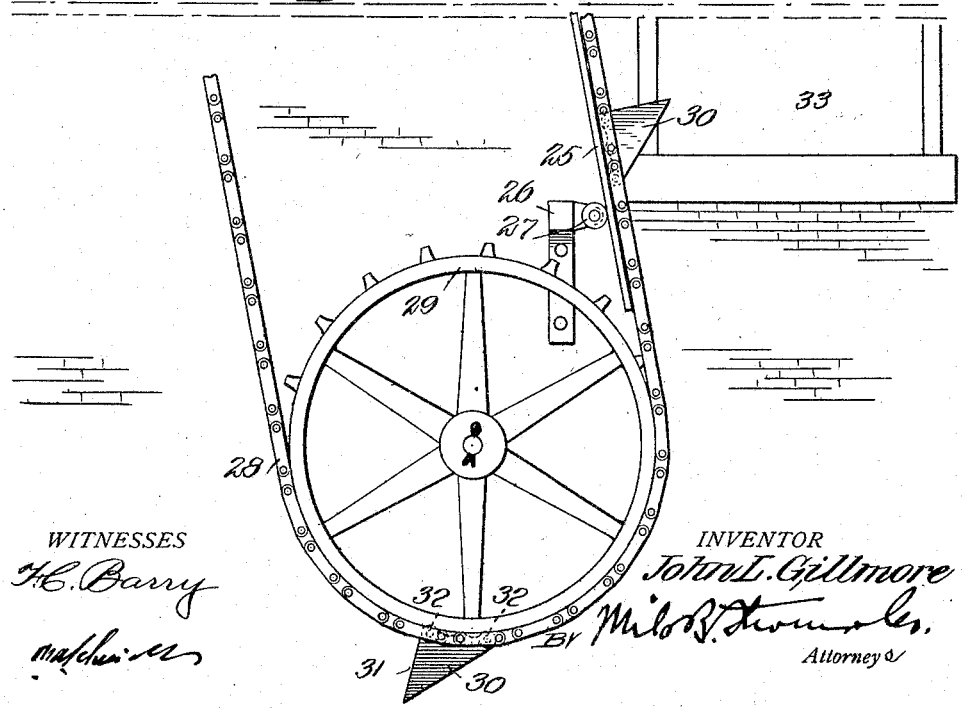
WITNESSES
INVENTOR
John L. Gillmore

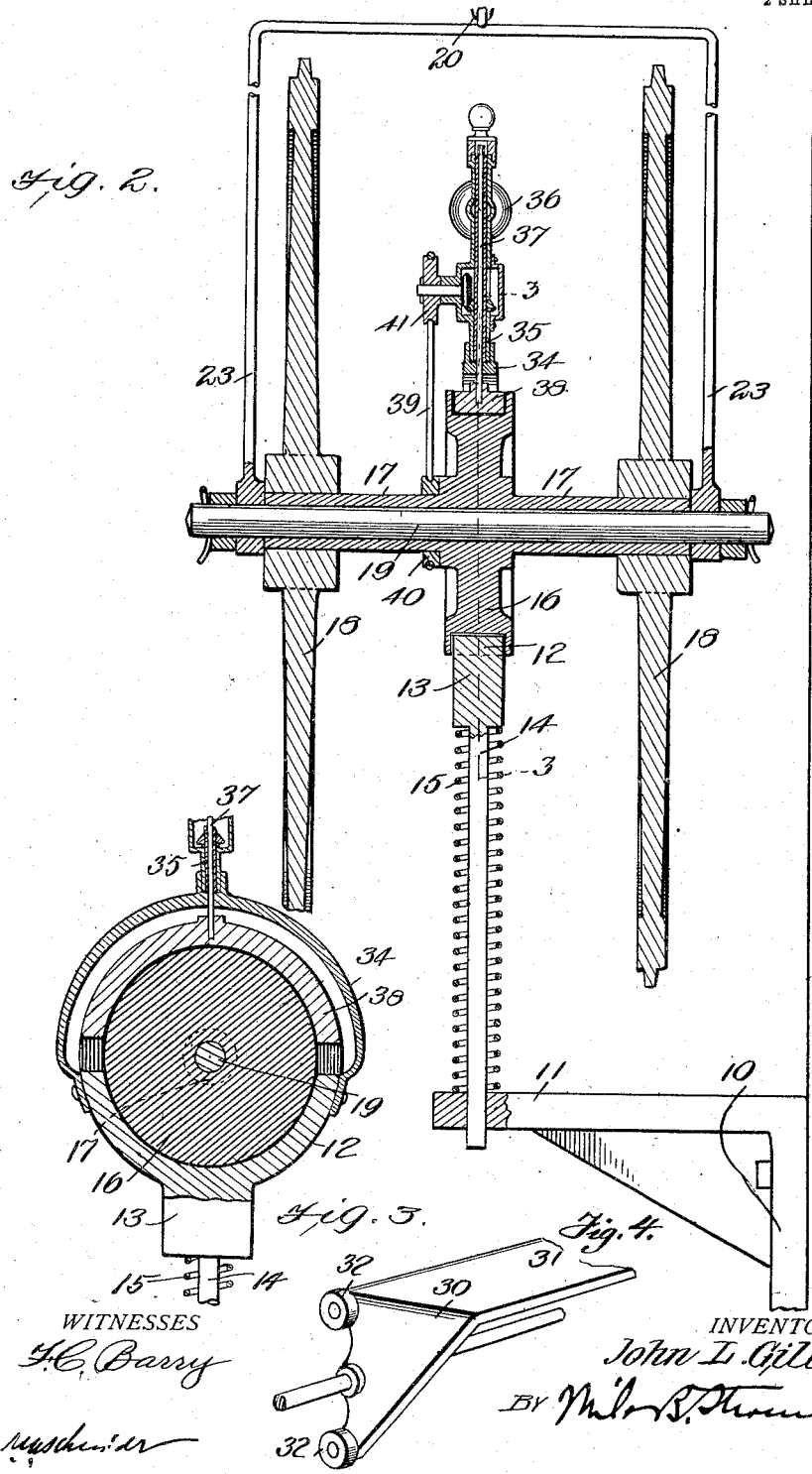

UNITED STATES PATENT OFFICE.

JOHN L. GILLMORE, OF EVERETT, WASHINGTON.

FIRE-ESCAPE.

1,015,485.  Specification of Letters Patent.  Patented Jan. 23, 1912.

Application filed March 10, 1911.  Serial No. 613,500.

*To all whom it may concern:*

Be it known that I, JOHN L. GILLMORE, a citizen of the United States, residing at Everett, in the county of Snohomish and State of Washington, have invented certain new and useful Improvements in Fire-Escapes, of which the following is a specification.

This invention relates to fire escapes of the endless carrier type, and it has for its object to provide an apparatus of this kind which is simple in construction, and safe and reliable in operation, and which can be readily attached to any building.

The invention also has for its object to provide improved means for checking the descent of the carrier, and also to provide certain novel structural details, as will be hereinafter described and claimed.

In the accompanying drawings forming a part of this specification—Figure 1 is a front elevation of the fire escape in position on the building. Fig. 2 is a cross section of the top portion of the apparatus. Fig. 3 is a section on the line 3—3 of Fig. 2. Fig. 4 is a perspective view of a fragment of one of the steps or platforms of the carrier.

Referring specifically to the drawings, 10 denotes a bracket which is securely fastened to the building in any suitable manner, near the top thereof, and which serves to support the top portion of the apparatus. The bracket has a horizontal arm 11 on which is supported a brake shoe 12 having a base portion 13, provided with a depending stem 14 which passes through a vertical opening in said arm, near the outer end thereof. Between the bottom of the base of the brake shoe, and the bracket arm 11 is located a spring 15, said spring being coiled around the stem 14. The brake shoe 12 engages the periphery of a brake drum or pulley 16, said periphery being flanged, as shown, to prevent lateral play of the brake shoe. The pulley 16 has on each side a hub extension 17, and each of said extensions carries a sprocket wheel 18. A shaft 19 passing through the hub extensions supports the brake pulley and the sprocket wheels. The sprocket wheels are made fast to the hub extensions, or they may be formed integral therewith, so that said sprocket wheels and the brake pulley will rotate together. The apparatus is suspended from a cable 20 passing over pulleys 21 and 22 mounted on the wall of the building. One end of the cable is connected to a yoke 23, the branches of which are connected to the shaft 19. The other end of the cable extends downwardly from the pulley 22 and carries a counterweight 24.

To the ends of the shaft 19 are also connected frame members 25 which extend downwardly toward the ground. To the building, near the ground, is made fast a bracket 26 carrying anti-friction rollers 27 with which the rear edges of the frame members are in contact. The rollers 27 are so positioned with respect to the shaft 19 that the frame members extend at an inclination toward the ground.

The carrier comprises endless chains 28 which pass around the sprocket wheels 18 at the top of the apparatus, and also around sprocket wheels 29 at the bottom thereof. The chains 28 carry steps, the same being located at suitable intervals thereon. These steps comprise end pieces 30, and a tread 31 extending therebetween. At the upper and lower ends of the end pieces 30 are rollers 32 which travel on the frame members 25, and substantially midway between said rollers the end pieces are suitably fastened to the chains.

The apparatus will be located so that the chains 28 travel in close proximity to the building, and the latter will be provided with exits 33 so located relative to the chains that a person may step from said exits onto any one of the steps as they pass. The chains extend toward the ground at an inclination parallel to the frame members 25, the chains being held in this position by reason of the engagement of the rollers 32 with said frame members.

In order to automatically check the descent of the carrier, a centrifugal governor is provided, the parts constituting the governor being constructed and arranged as follows: To the brake shoe 12 is rigidly fastened a yoke 34 carrying a hollow, vertical shaft 35 which supports the governing mechanism, the same comprising centrifugal balls or weights 36 which are operatively connected to a stem 37 mounted in the shaft 35, and carrying a brake shoe 38 adapted to engage the periphery of the pulley 16 on the side opposite the one that is engaged by the brake shoe 12. The governor is driven from the hub of the pulley 16 by means of a belt 39 passing over a pulley 40, on one of the hub extensions 17, and over a pulley 41, the shaft of which is suitably geared to the governor. When the apparatus is in operation, the rotary motion of the sprocket wheels 18 is communicated to the governor, and when an excessive speed is attained the governor balls 36 fly outwardly, whereupon the stem 37 moves downwardly and presses the brake shoe 38 against the periphery of the pulley 16, thus checking the descent of the carrier.

The purpose of the brake shoe 12 is also to check the descent of the carrier and to lower different weights to the ground at the same rate of speed. The weight 24 balances the apparatus, and the shoe 12 is normally out of contact with the periphery of the pulley 16. By lightening the weight the pulley 16 lowers toward the brake shoe. In operation, the weight of the person stepping on the carrier will lower the entire apparatus bodily, the pulley 16 then coming into engagement with the brake shoe 12, and forcing the latter downwardly against the tension of the spring 15. Thus a weight of fifty pounds put on the carrier, would produce a braking pressure of fifty pounds on the pulley 16, any greater weight placed on the carrier producing a corresponding increase in the braking action, thus causing different weights to be lowered to the ground at the same rate of speed. The greater the weight placed on the carrier, the greater will be the amount of compression of the spring 15 and the consequent braking action.

I claim:

1. A fire escape comprising an endless carrier, a counterweighted suspension device therefor, said endless carrier comprising sprocket wheels and their shaft, chains passing around said sprocket wheels, and load supporting devices carried by the chains, frame members connected to the shaft of the aforesaid sprocket wheels, and depending therefrom, a stationary support, a roller carried by said support and engageable with the frame members adjacent to their lower ends, a brake member connected to the carrier, a stationary support, and a brake shoe yieldingly mounted on the last-mentioned stationary support.

2. A fire escape comprising an endless carrier, a counterweighted suspension device therefor, a brake member connected to the carrier, a stationary support, a brake shoe yieldingly mounted on said support and adapted to engage the aforesaid brake member, a governing mechanism mounted on the brake shoe and operatively connected to the endless carrier, and a brake shoe operatively connected to the governing mechanism, said brake shoe engaging the aforesaid brake member of the carrier.

In testimony whereof I affix my signature in presence of two witnesses.

JOHN L. GILLMORE.

Witnesses:
THOMAS W. COBB,
M. M. SMITH.

---

Copies of this patent may be obtained for five cents each, by addressing the "Commissioner of Patents, Washington, D. C."